(12) United States Patent
Claude

(10) Patent No.: US 7,896,021 B2
(45) Date of Patent: Mar. 1, 2011

(54) QUICK CHANGE CHECK VALVE SYSTEM

(75) Inventor: Cordell E. Claude, Hamlin, NY (US)

(73) Assignee: Pulsafeeder, Inc., Rochester, NY (US)

( * ) Notice: Subject to any disclaimer, the term of this patent is extended or adjusted under 35 U.S.C. 154(b) by 449 days.

(21) Appl. No.: 12/079,580

(22) Filed: Mar. 27, 2008

(65) Prior Publication Data

US 2008/0236671 A1    Oct. 2, 2008

Related U.S. Application Data

(60) Provisional application No. 60/920,725, filed on Mar. 29, 2007.

(51) Int. Cl.
F16K 43/00 (2006.01)
F16K 15/00 (2006.01)

(52) U.S. Cl. ............... 137/15.18; 137/15.19; 137/315.11; 137/539

(58) Field of Classification Search ............... 137/15.18, 137/15.19, 315.11, 329.2, 511, 528, 532, 137/533, 539
See application file for complete search history.

(56) References Cited

U.S. PATENT DOCUMENTS

| 4,336,824 | A | * | 6/1982 | Steineman | 137/315.11 |
| 4,471,802 | A | * | 9/1984 | Pryor | 137/315.11 |
| 5,143,117 | A | | 9/1992 | Klein | |
| 6,478,047 | B1 | | 11/2002 | Powell | |
| 6,910,494 | B2 | * | 6/2005 | Warsakis | 137/315.33 |
| 2003/0089403 | A1 | | 5/2003 | Duncan et al. | |
| 2004/0134537 | A1 | | 7/2004 | Noll et al. | |

FOREIGN PATENT DOCUMENTS

WO    WO0188417 A1    11/2001

OTHER PUBLICATIONS

International Preliminary Report on Patentability from International Application No. PCT/US2008/004206 dated Oct. 8, 2009; Pulsafeeder, Inc. et al.

* cited by examiner

Primary Examiner — Kevin L Lee
(74) Attorney, Agent, or Firm — Hodgson Russ LLP

(57) ABSTRACT

A system for quickly removing and installing check valve parts without disturbing system piping attached to a pump. The system includes a first adapter attached to the outlet of the pump head. The first adapter includes a valve seat and a housing with a side wall having external threads. A second adapter includes a hollow body with a space for a check valve. The body has an opening in the side wall for inserting the check valve. The second adapter fits over the first adapter and the adapters are attached by means of a collar. Tightening the collar onto the threads on the first adapter causes the check valve to be held firmly between the valve seat and the top wall of the second adapter.

15 Claims, 3 Drawing Sheets

QUICK CHANGE CHECK VALVE SYSTEM

CROSS-REFERENCE TO RELATED APPLICATION

This application claims priority to U.S. Provisional Patent Application No. 60/920,725 filed on Mar. 29, 2007 and entitled "Quick Change Check Valve System," which is hereby incorporated by reference.

FIELD OF THE INVENTION

The present invention relates to check valves for reciprocating type fluid pumps.

BACKGROUND OF THE INVENTION

Reciprocating type fluid pumps typically use check valves built into the pump as part of the mechanism to produce flow. As normal wearing parts of the pump, these check valves require cleaning or replacement on a regular basis. Existing methods of installing cartridge-type check valves require disassembly or extensive movement of system piping in order to remove the check valves for maintenance. One exception to this requirement is a tie-bar type, check valve clamping mechanism. The tie-bar arrangements have some drawbacks such as leakage due to misalignment or due to variations in the tightening of the tie bar bolts. They also require metal components that may corrode when exposed to certain process fluids delivered by the pump.

There is a need for an improved system for removing the check valves for maintenance, cleaning, etc. that does not suffer from the drawbacks associated with tie-bar systems.

SUMMARY OF THE INVENTION

The present invention meets the above described need by providing a way to quickly remove and install check valve parts without disturbing system piping attached to the pump. Replacement costs are also reduced by replacing only the necessary parts instead of a complete cartridge valve assembly. The system consists of a pump reagent head, one suction check valve, one discharge check valve, two union nuts, and adapters to fit customer supplied piping.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
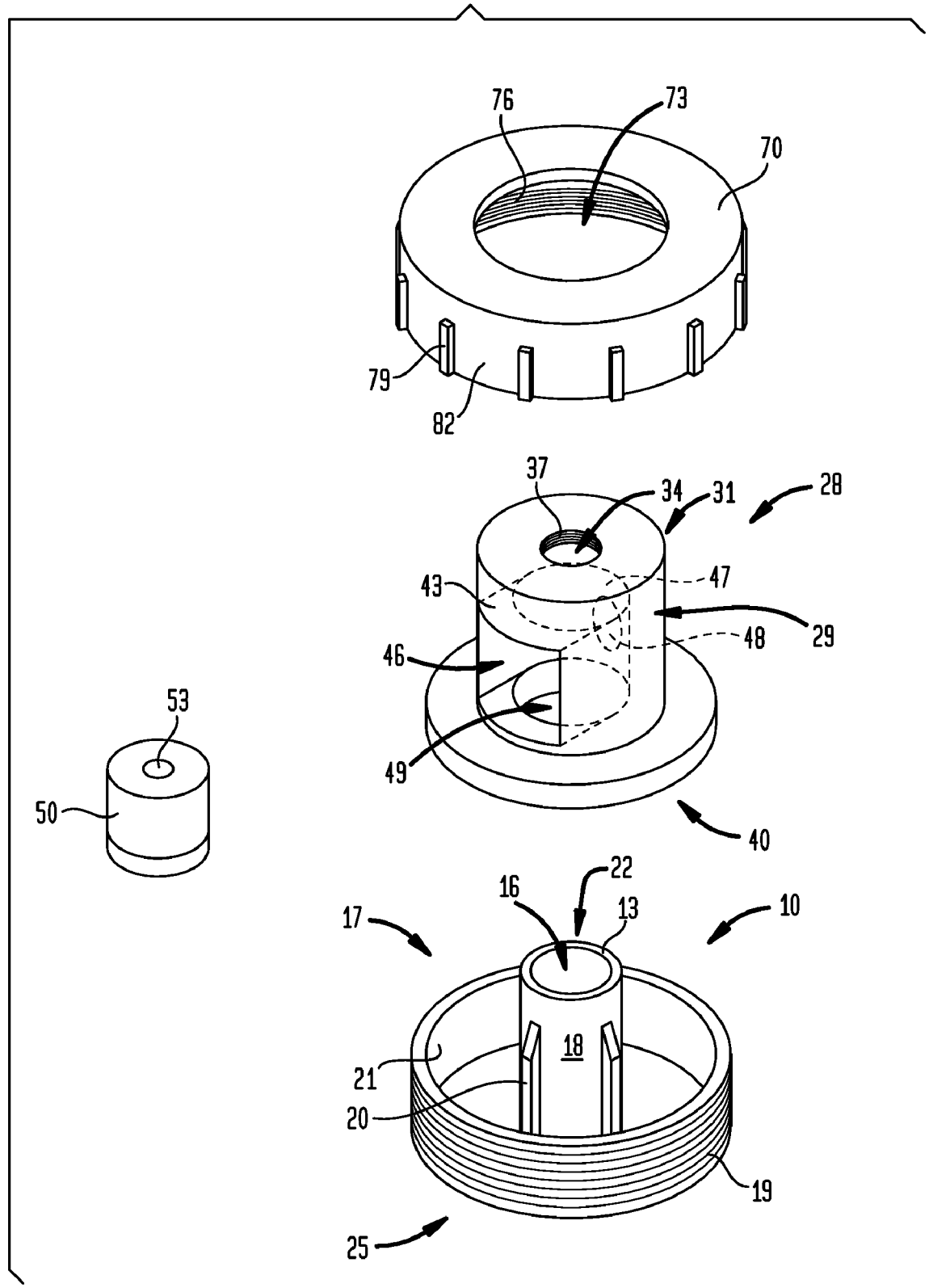
FIG. 1 is an exploded view of the check valve system of the present invention.

In FIG. 1, a first adapter 10 has a valve support 13 surrounding a central opening 16. The valve support 13 is disposed centrally on a upstanding member 18 with gussets 20. The upstanding member 18 is centered with respect to a housing 17. The housing 17 has a side wall 21 with a set of external threads 19 disposed thereon. The valve support 13 is disposed at a first end 22 of adapter 10. A second end 25 of adapter 10 is attached to the pump reagent head.

Figure 2:
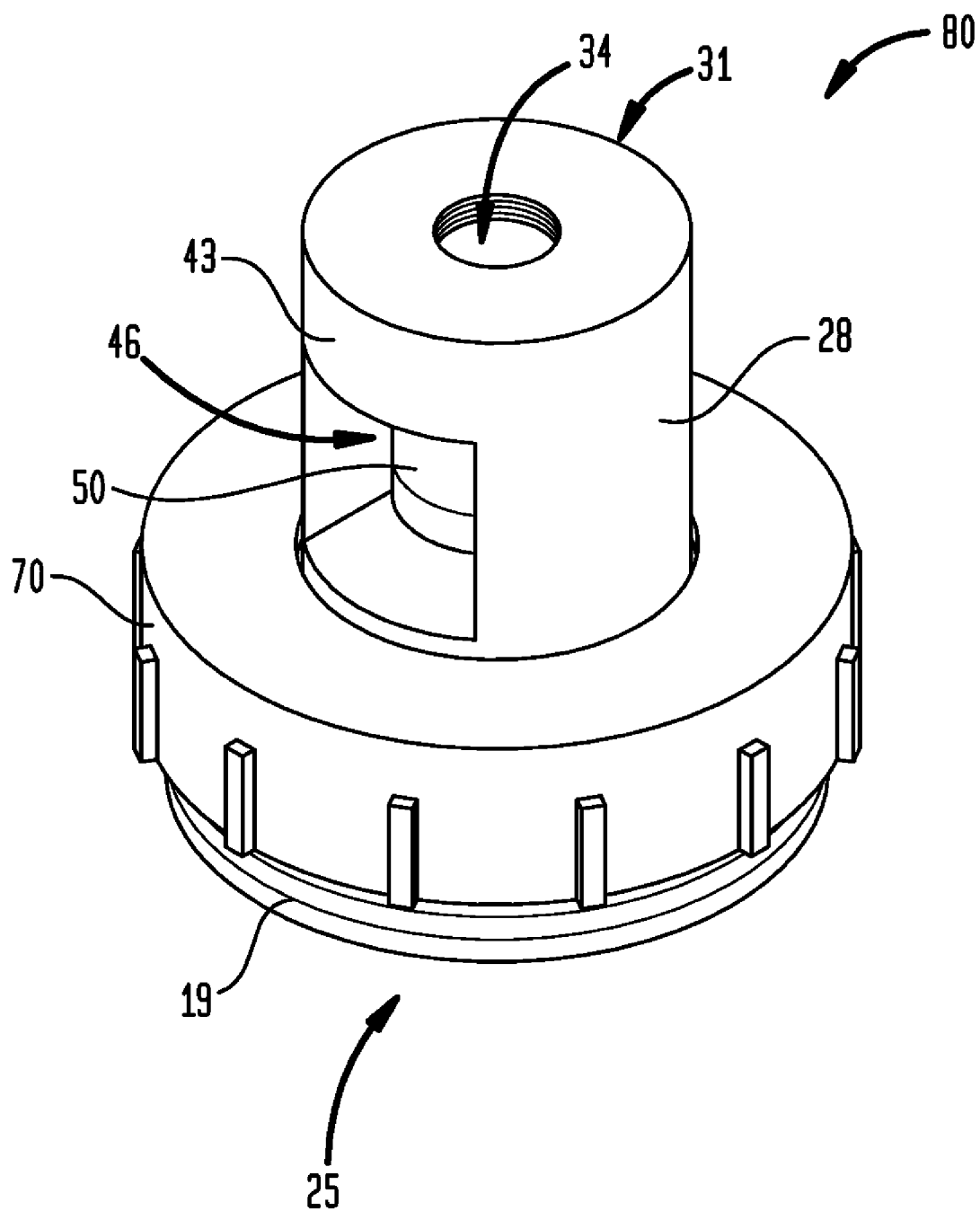
FIG. 2 is a perspective view of the check valve system of the present invention; and, FIG. 3 is a cross-section view of a check valve system of the present invention.
Figure 3:
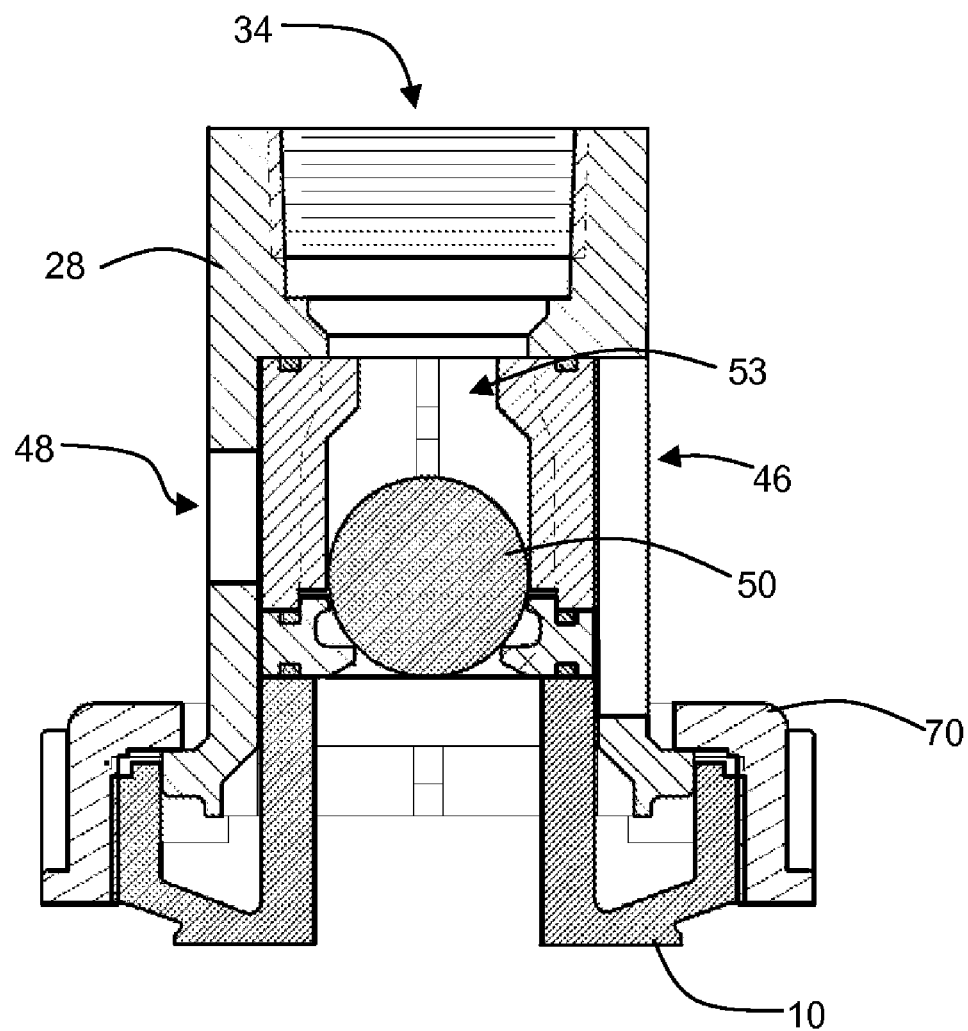

A second adapter 28 has a body 29 with a first end 31 having an opening 34 with a set of internal threads 37 disposed thereon. The first end 31 mates with customer supplied piping. The adapter 28 has a second end 40 that fits over the first end 22 of the first adapter 10. The body 29 has a side wall 43 with an opening 46 defined therein. The body 29 also has an opening 49 capable of being disposed in registry with opening 16 when the parts are assembled as shown in FIG. 2. The opening 49 has female slots that engage gussets 20 so that the adapter 28 does not rotate relative to adapter 10 when they are assembled. This also allows the opening 46 to be positioned at increments equivalent to the rib 20 angular spacing (facing forward, sideways, or backward) to improve accessibility to check the valves in various installations.

A check valve 50 has a central passageway 53 where fluids pass in a single direction as will be evident to those of ordinary skill in the art based on this disclosure. The check valve 50 may be inserted into the adapter 28 through the opening 46. The valve 50 is centered in the adapter 28 and engages with the valve support 13 at the bottom and engages with the inside top wall 47 of the adapter 28 at the first end 31 such that the passageway 53 is disposed in registry with the opening 34.

With the adapter 28 positioned on the adapter 10, a collar 70 with a central opening 73 is positioned over adapter 28. The collar 70 has a set of internal threads 76 that engage with the threads 19 on the outer wall of adapter 10. When the collar 70 is manually rotated by means of a set of ribs 79 disposed on the outer wall 82, the check valve 50 is pressed between the top inner wall 47 of the adapter 28 and the valve support 13. When the engagement between the collar 70 and the threads on the adapter 10 is loosened, the check valve 50 can be removed for repair or replacement without tools and without disturbing the system piping. A hole 48 in adapter 28 allows the check valve to be pushed out of the adapter 28 when the collar 70 is loosened.

Turning to FIG. 2, the quick change check valve system 80 is shown in the assembled position with the check valve 50 disposed inside adapter 28 but visible through opening 46. In this configuration, the check valve 50 is compressed between the inside top wall of the adapter 28 and the valve seat 13. By rotating the collar 70 counterclockwise, the compression is removed and there is sufficient clearance to remove the check valve 50 through the opening 46 in adapter 28. The first adapter 10 and the second adapter 28 may be configured to interface with customer supplied piping. The system has an indexable servicing window for better accessibility to the check valve parts.

The present invention provides many advantages including rapid removal and installation of valve parts without removal of piping. The system provides for even tightening and compression of sealing gaskets to prevent leakage. The system may be provided with a construction consisting of all corrosion resistant materials. However, metal parts can also be used to achieve many of the other benefits of the invention. The system can be serviced without the use of tools. The system also allows for viewing the check valve operation through clear or opaque check valve guides. The upper section of adapter 28 is fully enclosed for strength and to resist distortion in the molding process. The discharge and inlet can be dual connection type—female pipe thread and raised face screw on flange system (universal ANSI/DIN).

Also, the system can be used with pump head, in-line, or foot valves as will be evident to those of ordinary skill in the art based on this disclosure.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A check valve system, comprising:
   a first adapter having a side wall with external threads, a central opening and an upstanding member defining a valve seat;
   a second adapter having a body with a side wall and a top wall bordering a central opening, the top wall having an opening defined therein in communication with the central opening, the side wall having an opening defined therein in communication with the central opening, the second adapter sized to fit over the first adapter such that the upstanding member on the first adapter is received in the central opening of the second adapter;
   a check valve sized to fit through the opening in the side wall of the second adapter, the check valve having a first end, a second end, and a central passageway, the check valve sized to fit inside the body of the second adapter between the valve seat and the top wall of the second adapter; and,
   a collar having a central opening capable of receiving the body of the second adapter there through, the collar having internal threads capable of engaging with the threads on the side wall of the first adapter to move the top wall of the second adapter toward the valve seat to secure the check valve in position.

2. The check valve system of claim 1, wherein the upstanding member has a diameter that is smaller than the diameter of the side wall.

3. The check valve system of claim 1, wherein the upstanding member has a plurality of gussets extending therefrom.

4. The check valve system of claim 3, further comprising slots bordering the central opening, the slots capable of receiving the gussets when the second adapter is placed over the first adapter.

5. The check valve system of claim 1, wherein the opening in the top wall of the second adapter has threads disposed thereon.

6. The check valve system of claim 1, wherein the collar has a set of external ribs disposed thereon.

7. The check valve system of claim 1, wherein the body has an opening disposed opposite to the opening in the side wall for inserting a tool for pushing the check valve through the opening in the side wall.

8. A check valve system, comprising:
   a first adapter having a valve seat surrounding a central opening and having a side wall with external threads disposed thereon;
   a second adapter having a body with a first end, a second end, and a central opening, the body being formed from at least one side wall and a top wall, the top wall having an opening therein, the side wall having an opening therein, the second adapter sized to fit over the first adapter such that the valve seat is received in the central opening;
   a check valve sized to fit through the opening in the side wall of the second adapter, the check valve sized to fit inside the body of the second adapter between the valve seat and the top wall of the second adapter; and,
   a collar having a central opening capable of receiving the body of the second adapter therethrough, the collar having internal threads capable of engaging with the threads on the side wall of the first adapter.

9. The check valve system of claim 8, wherein the valve seat is formed on an upstanding member, the upstanding member having a diameter that is smaller than the diameter of the side wall.

10. The check valve system of claim 9, wherein the upstanding member has a plurality of gussets extending therefrom.

11. The check valve system of claim 10, further comprising slots bordering the central opening, the slots capable of receiving the gussets when the second adapter is placed over the first adapter.

12. The check valve system of claim 8, wherein the opening in the top wall of the second adapter has threads disposed thereon.

13. The check valve system of claim 8, wherein the collar has a set of external ribs disposed thereon.

14. The check valve system of claim 8, wherein the body has an opening disposed opposite to the opening in the side wall for inserting a tool for pushing the check valve through the opening in the side wall.

15. A method of installing a check valve on a pump head having an outlet, the method comprising:
   attaching a first adapter to the outlet of the pump head, the first adapter having a side wall with external threads, a central opening and an upstanding member defining a valve seat;
   providing a second adapter having a body with a side wall and a top wall bordering a central opening, the top wall having an opening defined therein in communication with the central opening, the side wall having an opening defined therein in communication with the central opening, the second adapter sized to fit over the first adapter such that the upstanding member on the first adapter is received in the central opening of the second adapter;
   providing a check valve with the a first end, a second end, and a central passageway;
   placing the check valve inside the body of the second adapter through the opening in the side wall;
   placing the second adapter onto the first adapter such that the check valve is positioned between the valve seat on the first adapter and the top wall of the second adapter;
   proving a collar having a central opening capable of receiving the body of the second adapter therethrough, the collar having internal threads capable of engaging with the threads on the side wall of the first adapter to move the top wall of the second adapter toward the valve seat to secure the check valve in position;
   placing the collar over the second adapter and engaging the threads on the collar with the threads on the first adapter such that the check valve is secured between the valve seat and the top wall of the second adapter.

* * * * *